United States Patent
Isidore

(10) Patent No.: US 8,934,881 B2
(45) Date of Patent: Jan. 13, 2015

(54) MOBILE COMMUNICATION DEVICES

(71) Applicant: Eustace Prince Isidore, Austin, TX (US)

(72) Inventor: Eustace Prince Isidore, Austin, TX (US)

( * ) Notice: Subject to any disclaimer, the term of this patent is extended or adjusted under 35 U.S.C. 154(b) by 0 days.

(21) Appl. No.: 13/723,136

(22) Filed: Dec. 20, 2012

(65) Prior Publication Data

US 2014/0018050 A1 Jan. 16, 2014

Related U.S. Application Data

(62) Division of application No. 12/871,904, filed on Aug. 30, 2010, now abandoned.

(51) Int. Cl.

| | |
|---|---|
| *H04M 3/42* | (2006.01) |
| *H04W 4/16* | (2009.01) |
| *H04M 1/725* | (2006.01) |
| *H04W 8/18* | (2009.01) |
| *H04W 8/26* | (2009.01) |
| *G06F 17/24* | (2006.01) |
| *H04M 3/44* | (2006.01) |
| *H04M 3/436* | (2006.01) |
| *H04L 29/06* | (2006.01) |
| *H04W 8/22* | (2009.01) |
| *H04W 88/06* | (2009.01) |

(52) U.S. Cl.
CPC ............ *H04W 4/16* (2013.01); *H04M 1/72519* (2013.01); *H04W 8/183* (2013.01); *H04W 8/26* (2013.01); *G06F 17/24* (2013.01); *H04M 3/44* (2013.01); *H04M 3/42187* (2013.01); *H04M 3/436* (2013.01); *H04W 8/22* (2013.01); *H04W 88/06* (2013.01); *H04M 3/42246* (2013.01); *H04M 2201/40* (2013.01)
USPC .......................................... 455/416; 455/417

(58) Field of Classification Search
CPC .................................. H04M 3/56; H04M 3/58
USPC .............................. 455/416, 417; 379/142.07
See application file for complete search history.

(56) References Cited

U.S. PATENT DOCUMENTS

| | | | |
|---|---|---|---|
| 8,639,229 B2 * | 1/2014 | Apfel et al. .................... | 455/416 |
| 2006/0098792 A1 * | 5/2006 | Frank et al. ..................... | 379/70 |

* cited by examiner

*Primary Examiner* — Lee Nguyen

(74) *Attorney, Agent, or Firm* — Isidore PLLC

(57) ABSTRACT

A method, improved communication device, and application program product enhances and expands the features and functionality of wireless communication devices and mobile computing devices. The embodiments provide the following functionality: (1) Simultaneous texting during ongoing voice communication, providing a text waiting mode for both single number mobile communication devices and multiple number mobile communication devices; (2) Dynamic area code determination and automatic pre-pending of area codes when a requested voice or text communication is initiated without the area code while the mobile communication device is outside of its home-base area code toll area; (3) Enhanced editing functionality for applications on mobile computing devices; (4) Automatic toggle from manual texting mode to voice-to-text based communication mode on detection of high velocity movement of the mobile communication device.

9 Claims, 10 Drawing Sheets

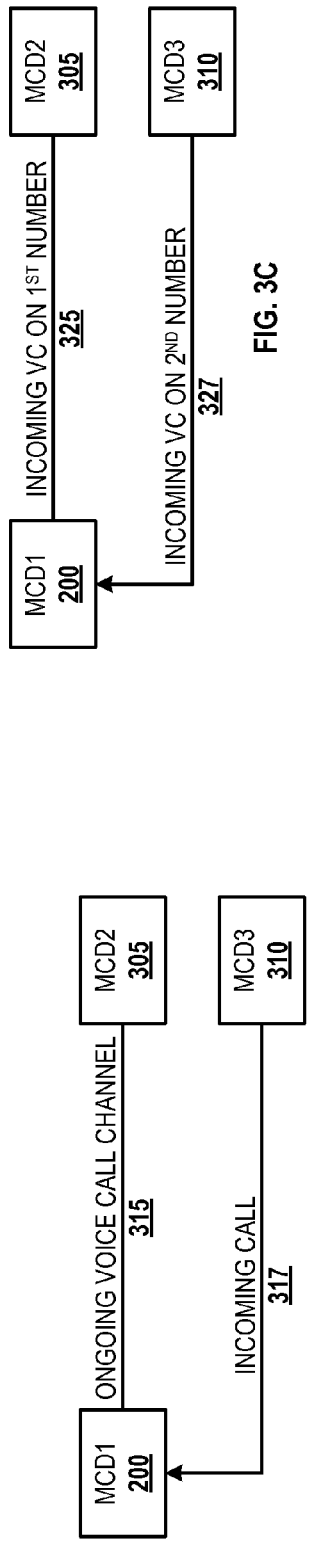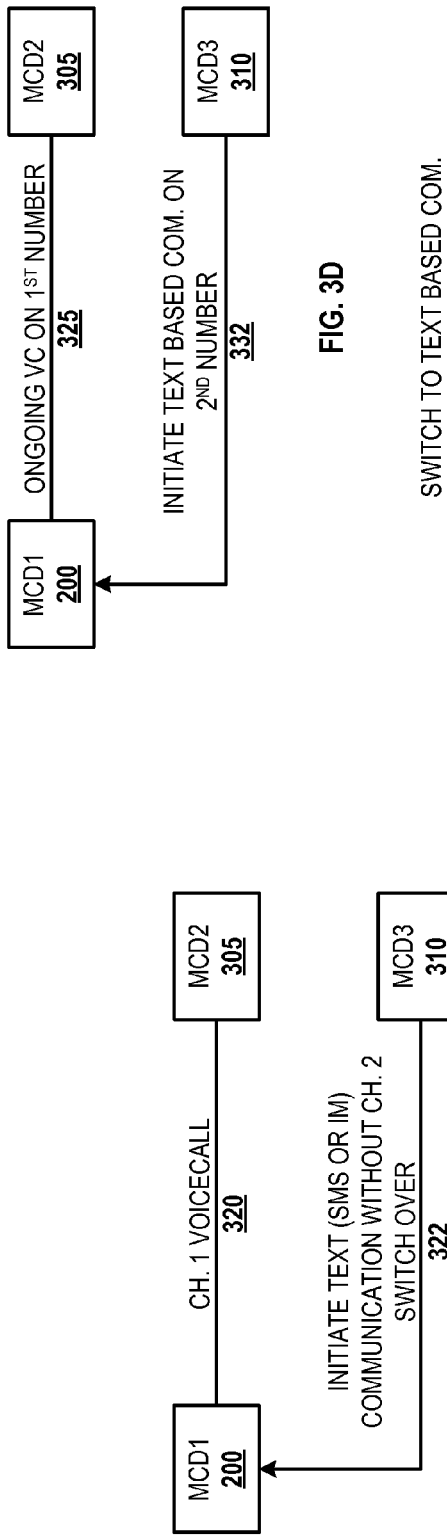

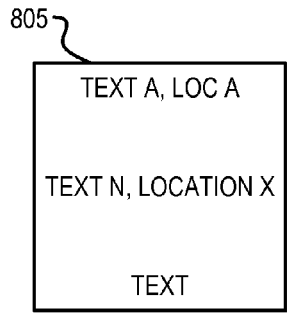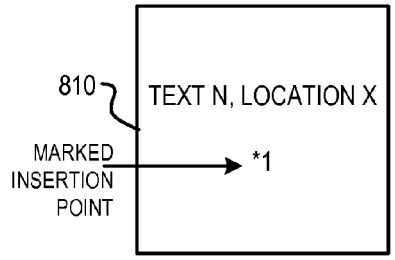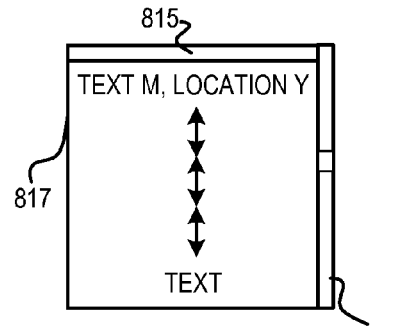
FIG. 8A　　　FIG. 8B　　　FIG. 8C
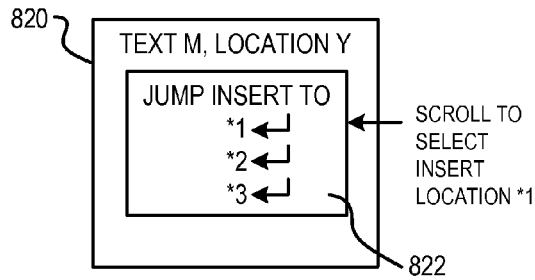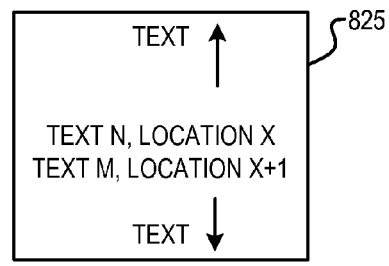
FIG. 8D　　　FIG. 8E
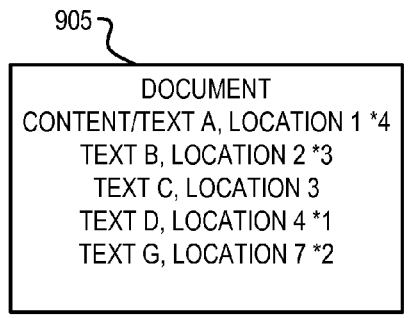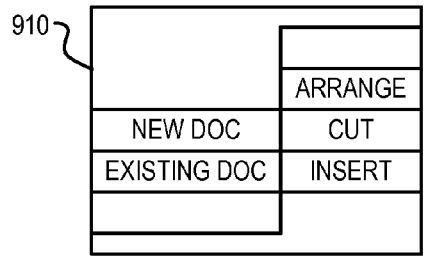
FIG. 9A　　　FIG. 9B
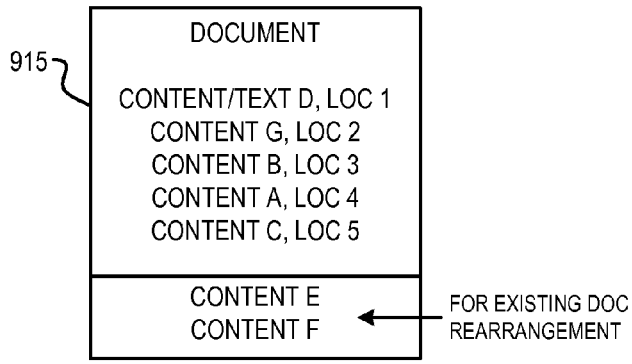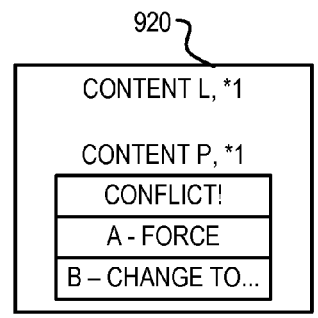
FIG. 9C　　　FIG. 9D

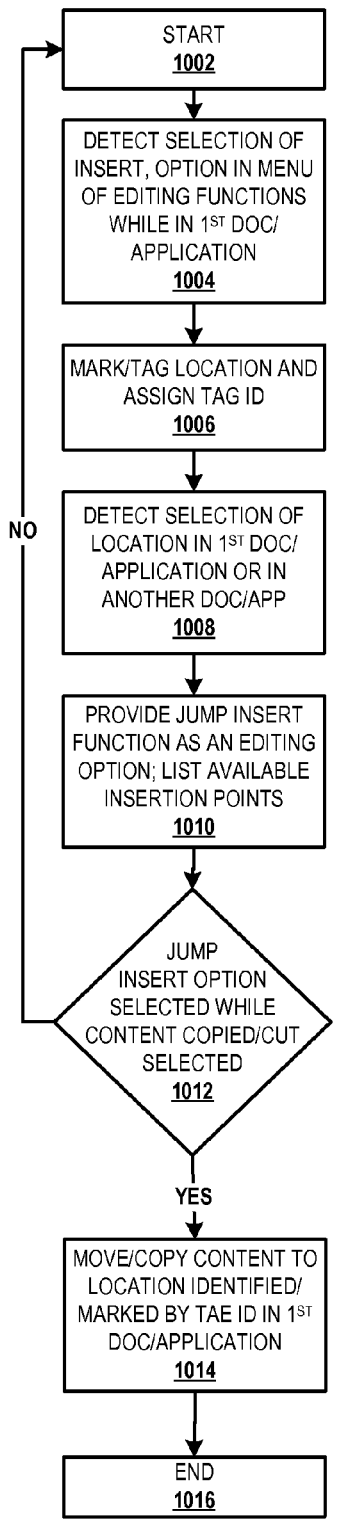
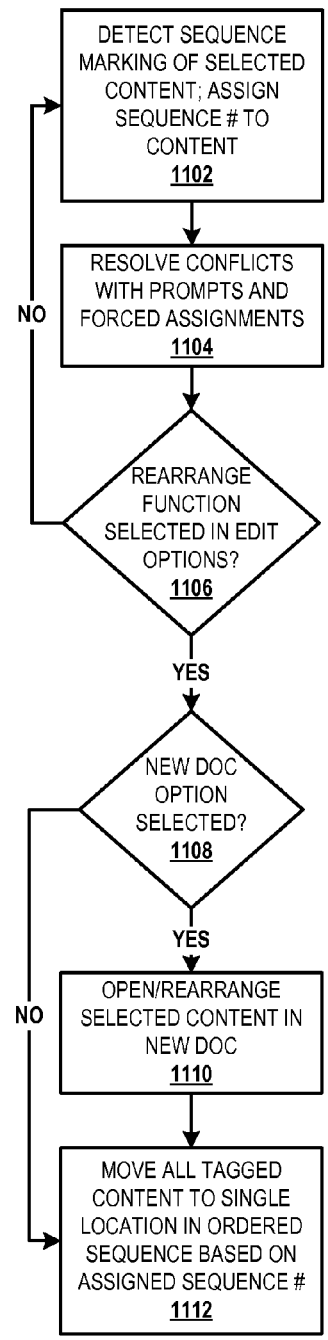
FIG. 10
FIG. 11

MOBILE COMMUNICATION DEVICES

The present application is a divisional of U.S. patent application Ser. No. 12/871,904, filed on Aug. 30, 2010, titled Improved Mobile Communication Devices, the contents of which is incorporated herein.

PRIORITY

Embodiments of the present application are related to and claim priority from the following previously-file applications:
1. U.S. Provisional Application Ser. No. 61/238,092, filed on Aug. 28, 2009; and
2. U.S. Provisional Application Ser. No. 61/249,744, filed on Oct. 8, 2009.

The content of these provisional applications are incorporated herein by reference.

RELATED APPLICATIONS

The present application is a continuation-in part a divisional of, and is related to, and claims priority from the following previously-filed US applications:
3. U.S. application Ser. No. 12/697,742, filed on Aug. 26, 2010, and which has a priority date of Aug. 26, 2009; and
4. U.S. application Ser. No. 12/579,035, filed on Oct. 14, 2009, which is a continuation of U.S. application Ser. No. 11/375,892, which has a priority date of Mar. 25, 2005.

Relevant content of these previously-filed applications are incorporated herein by reference.

BACKGROUND OF THE INVENTION

1. Field of the Invention

Embodiments described herein relate generally to mobile computing and communication devices. Still more particularly, the embodiments relate to a mobile communication device and a method that enable advanced operational and editing features with functions and applications running on the mobile communication device.

2. Description of the Related Art

Mobile devices, and in particular mobile communication devices, such as cellular phones, personal digital assistants (PDAs), Blackberry®, and portable computers are very widely utilized for both personal and business applications. A large proportion of these devices include secondary hardware and/or software components that enable the devices to be utilized to provide more than voice communication services. Among these other features supported by these devices are: SMS texting, mobile computing via smart phones and PDAs equipped with mobile operating systems (e.g., MS Mobile® or Android®), and global positioning system (GPS) based applications, such as navigation and location based services. As the industry for mobile computing, and in particular integrated mobile computing and communication devices, evolves and continues to expand rapidly, sophisticated device users continually look for improvements which enhance their experience with their mobile communication device while gaining more computing and communication functionality within the mobile communication device.

SUMMARY OF THE CLAIMED SUBJECT MATTER

The disclosed embodiments provide a plurality of methods, improved communication devices, and application program products enhancing and expanding the features and functionality of wireless communication devices and mobile computing devices. The various methods, systems and application program products provide the following functionality: (1) Simultaneous texting during ongoing voice communication, providing a text waiting mode for both single number mobile communication devices and multiple number mobile communication devices; (2) Dynamic area code determination and automatic back-filling/pre-pending of area codes when a requested voice or text communication is initiated without the area code while the mobile communication device is outside of its home-base area code toll area; (3) Enhanced editing functionality for applications on mobile computing devices; (4) Automatic toggle from manual texting mode to voice-to-text based communication mode on detection of high velocity movement of the mobile communication device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The following description of the illustrative embodiments are described with reference to the drawings, in which like numbers represent the same or similar elements, as follows:

FIGS. 3A-3E illustrates a series of processes by which a single communication device simultaneously completes a voice communication with a second communication device, while completing text communication on a second communication channel for a subsequently received communication request, according to one or more embodiments;

FIGS. 8A-8E illustrates a sequence of graphical user interfaces that may be generated during implementation of one or more advanced editing functions, in accordance with one or more embodiments;

FIGS. 9A-9D illustrates a sequence of graphical user interfaces that may be generated during implementation of additional advanced editing functions, in accordance with one or more embodiments;

FIGS. 10-11 are high-level flow diagrams of the methods by which advanced editing functions are completed on a mobile computing device, in accordance with various embodiments;

DETAILED DESCRIPTION OF ILLUSTRATIVE EMBODIMENTS

Figure 1:
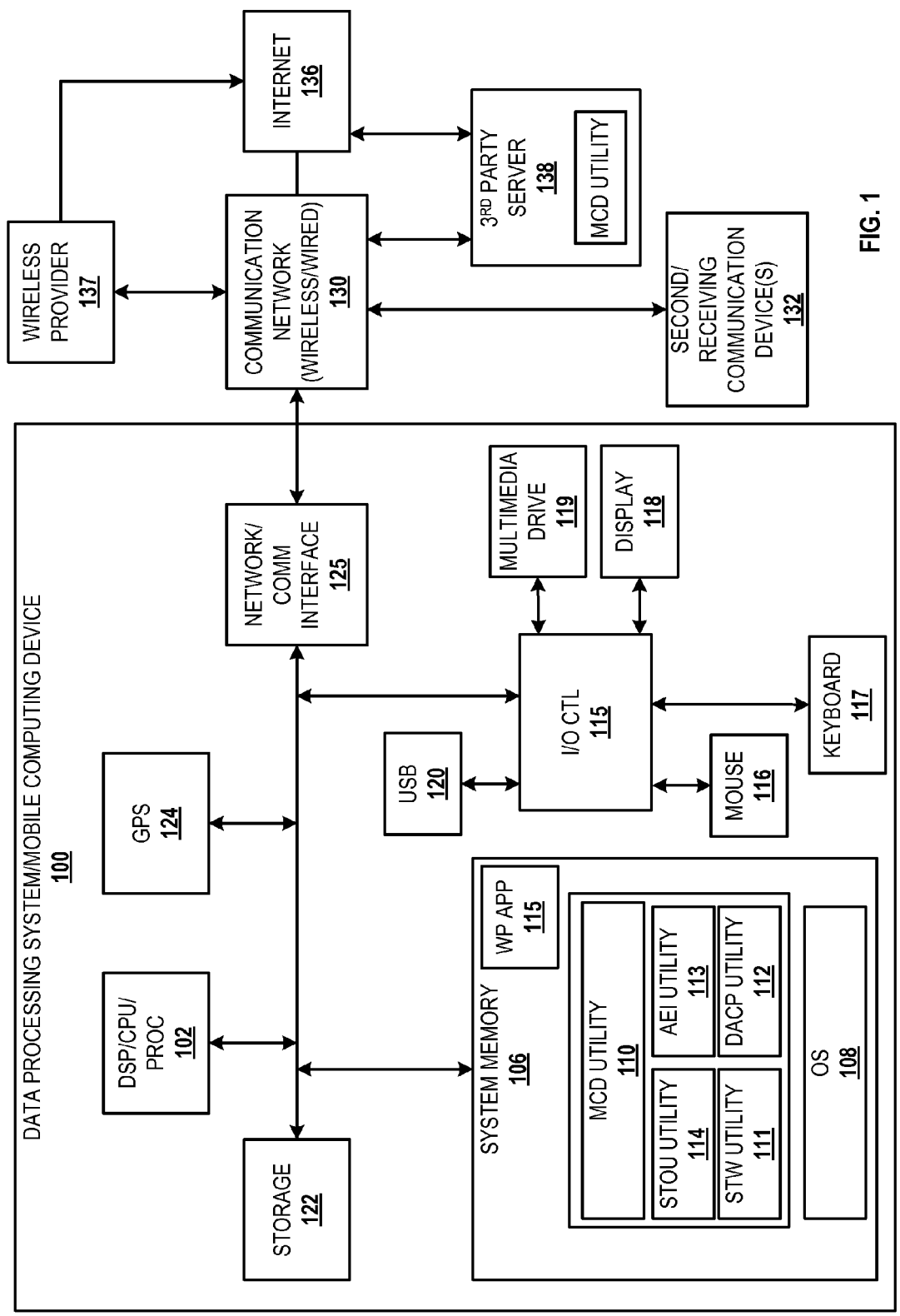
FIG. 1 is a block diagram representation of an example mobile computing device within which several of the features of the described embodiments may be implemented, according to one embodiment.

Generally, the illustrative and described embodiments provide a plurality of methods, improved communication devices, and application program products enhancing and expanding the features and functionality of wireless communication devices and mobile computing devices. The various methods, systems and application program products provide the following functionality: (1) Simultaneous texting during ongoing voice communication, providing a text waiting mode for both single number mobile communication devices and multiple number mobile communication devices; (2) Dynamic area code determination and automatic back-filling/pre-pending of area codes when a requested voice or text communication is initiated without the area code while the mobile communication device is outside of its home-base area code toll area; (3) Enhanced editing functionality for applications on mobile computing devices; (4) Automatic toggle from manual texting mode to voice-to-text based communication mode on detection of high velocity movement of the mobile communication device.

In the following detailed description of the embodiments, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. For example, as utilized herein, the following terms are generally defined:

(1) Mobile computing/communication device (MCD): is a device that may be a mobile communication device, such as a cell phone, or a mobile computer that performs wired and/or wireless communication via a connected wireless/wired network. In some embodiments, the MCD comprises a combination of the functionality associated with both types of devices within a single standard device (e.g., a smart phones or personal digital assistant (PDA)) for use as both a communication device and a computing device.

Referring now to the figures, each of which is presented with a brief and introductory descriptions followed by general references to certain select portions of the figures and/or a general description of the functionality associated with or illustrated by the particular figure(s). Within the descriptions of the figures, similar elements are provided similar names and reference numerals as those of the previous figure(s). The specific numerals assigned to the elements/components/blocks/features are provided solely to aid in the description and not meant to imply any limitations (structural or functional or otherwise) on the described embodiment.

With specific reference now to the figures, and beginning with FIG. 1, there is depicted a block diagram representation of an example mobile computing device (MCD), within which several of the features of the described embodiments may be implemented. MCD 100 may be a desktop computer, a portable computing device, such as a laptop, personal digital assistant (PDA), a smart phone, and/or other types of electronic devices that may generally be considered processing devices. As illustrated, MCD 100 comprises at least one processor or central processing unit (CPU) 102 connected to system memory 106 via system interconnect/bus 104. Also connected to system bus 104 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 120 are illustrated, coupled to I/O controller 115. Multimedia drive 119 and USB port 120 enable insertion of a removable storage device (e.g., optical disk or "thumb" drive) on which data/instructions/code may be stored and/or from which data/instructions/code may be retrieved. MCD 100 also comprises storage 122, within/from which data/instructions/code may also be stored/retrieved. MCD 100 further comprises a global positioning system (GPS) or local position system (LPS) detection component 124 by which MCD is able to detect its current location (e.g., a geographical position) and movement of MCD 100, in real time. MCD 100 is also illustrated with a network/communication interface 125, by which MCD 100 may connect to one or more second communication devices 132 or to wireless service provider server 134, or to a third party server 138 via one or more access/external communication networks, of which a wireless network 132 is provided as one example and the Internet 136 is provided as a second example. It is appreciated that MCD 100 may connect to third party server 138 through an initial connection with service provider server 134, which in turns connects to third party server via the Internet 136.

In addition to the above described hardware components of MCD 100, various features of the described embodiments are completed/supported via software (or firmware) code or logic stored within memory 106 or other storage (e.g., storage 122) and executed by CPU 102. Thus, for example, illustrated within memory 106 are a number of software/firmware/logic components, including operating system (OS) 108 (e.g., Microsoft Windows® or Windows Mobile®, trademarks of Microsoft Corp, or GNU®/Linux®, registered trademarks of the Free Software Foundation and The Linux Mark Institute, and AIX®, registered trademark of International Business Machines), and (word processing and/or other) application(s) 115. Also illustrated are a plurality (four illustrated) software implemented utilities, each providing different one of the various functions (or advanced features) described herein. Including within these various functional utilities are: Simultaneous Text Waiting (STW) utility 111, Dynamic Area Code Pre-pending (DACP) utility 112, Advanced Editing and Interfacing (AEI) utility 112 and Safe Texting Device Usage (STDU) utility 114. In actual implementation and for simplicity in the following descriptions, each of these different functional utilities are assumed to be packaged together as sub-components of a general MCD utility 110, and the various utilities are interchangeably referred to as MCD utility 110 when describing the utilities within the figures and claims. For simplicity, the following description will refer to a single utility, namely MCD utility 110. MCD utility 110 may, in certain embodiments, be combined with one or more other software modules, including for example, word processing application(s) 115 and/or OS 108 to provide a single executable component, which then provides the collective functions of each individual software component when the corresponding combined code of the single executable component is executed by CPU 101. Each separate utility 111/112/113/114 is illustrated and described as a standalone or separate software/firmware component/module, which provides specific functions, as described below. As a standalone component/module, MCD utility 110 may be acquired as an off-the-shelf or after-market or downloadable enhancement to existing program applications or device functions, such as voice call waiting functionality (not shown) and user interactive applications with editable content, such as application within the Windows Mobile® suite of applications. In at least one implementation, MCD utility 110 may be downloaded from a server or website of a wireless provider (e.g., wireless provider server 132) or a third party server 138, and either installed on MCD 100 or executed from the server 132/138.

CPU 101 executes MCD utility 110 as well as OS 108, which, in one embodiment, supports the user interface features of MCD utility 110, such as generation of a graphical user interface (GUI), where required/supported within MCD utility code. In several of the described embodiments, MCD utility 110 generates/provides one or more GUIs to enable user interaction with, or manipulation of, functional features of MCD utility 110 and/or of MCD 100. MCD utility 100 may, in certain embodiments, enable certain hardware and firmware functions and may thus be generally referred to as MCD logic.

Certain of the functions supported and/or provided by MCD utility 110 are enabled as processing code/instructions/logic executing on DSP/processor 102 and/or other device hardware, and the processor thus completes the implementation of those function(s). Among the software code/instructions/logic provided by MCD utility 110, and which are specific to the described embodiments of the invention, are code/logic for performing several (one or a plurality) of the following functions: (1) Simultaneous texting during ongoing voice communication providing a text waiting mode for both single number mobile communication devices and multiple number mobile communication devices; (2) Dynamic area code determination and automatic back-filling of area codes when a requested/desired voice or text communication is initiated without the area code while the mobile communication device is outside of its home-base area code toll area; (3) Enhanced editing functionality for applications on mobile computing devices; (4) Automatic toggle from manual texting mode to voice-to-text based communication mode on detection of high velocity movement of the mobile communication device; and (5) Enhanced e-mail notification system providing advanced e-mail notification via (sender or recipient directed) texting to a mobile communication device.

Each of the methods described herein and illustrated by the block diagrams and flow charts are provided by program code or utility that is executed by/with one or more hardware devices of an MCD 100/200. For purposes of the various descriptions, these functional features and/or embodiments are described from the perspective of the MCD utility 110 and/or the MCD 100/200 performing or enabling the specific functions/features.

Figure 2:
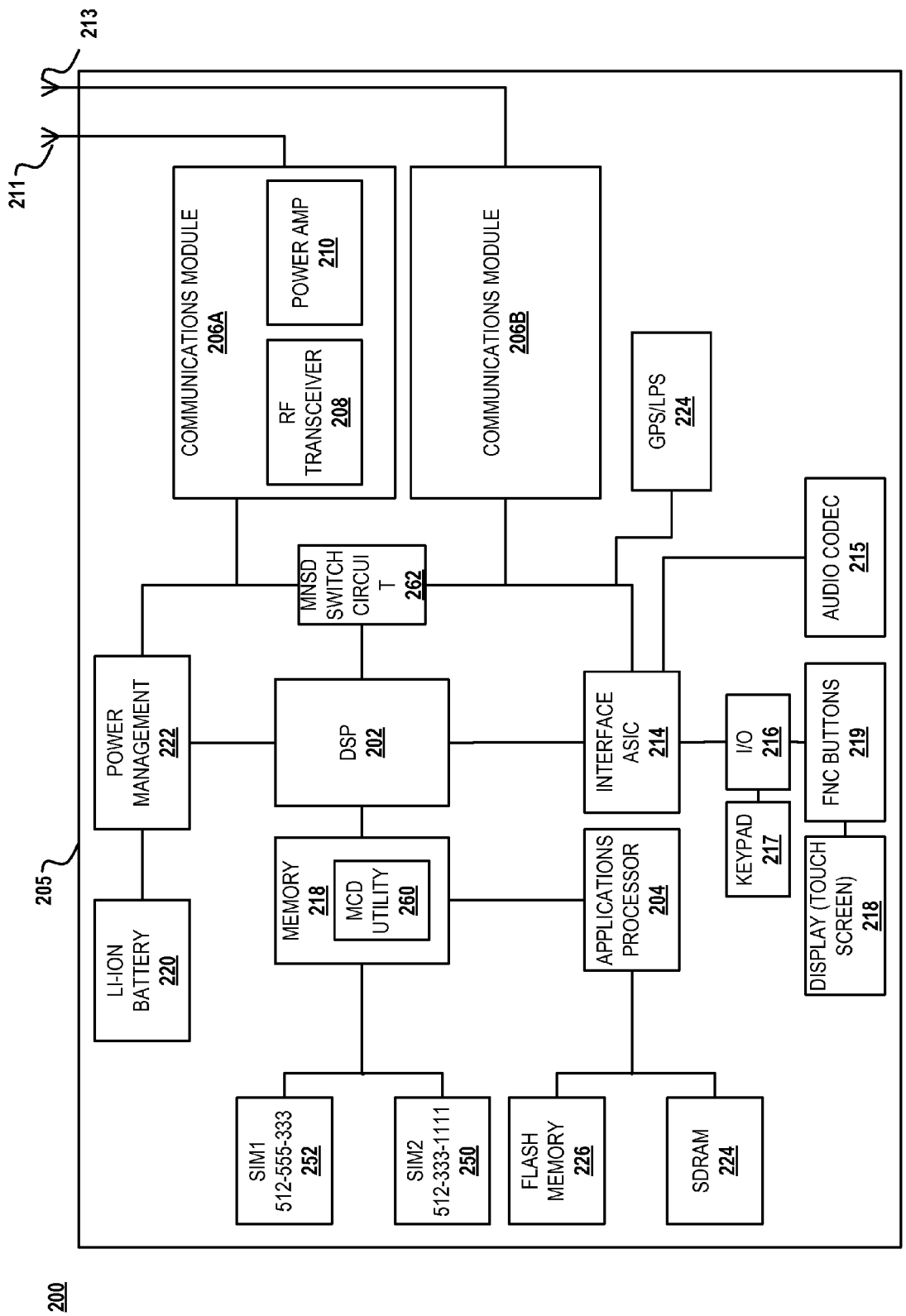
FIG. 2 is a block diagram representation of an example mobile communication device (MCD) within which several of the features of the described embodiments may be implemented, in accordance with one embodiment.

FIG. 2 is a block diagram representation of an example mobile communication device within which several of the features of the described embodiments may be implemented, in accordance with one embodiment. As with FIG. 1, for purposes of illustration and description herein, FIG. 2 illustrates an example MCD which is a mobile communication device, such as a cell phone, BlackBerry®, or other similar device. For simplicity in describing the invention, both mobile computing device and mobile communication device are collectively referred to as MCD, and specific features of the various described embodiments are applicable to any devices which generally fall within these general categories of devices. In one embodiment, the features of one or more embodiments of the various different embodiments are implemented within a dual subscriber number single device (DNSD) or a multiple number single device MNSD MCD. FIG. 2 illustrates such a DNSD MCD, and is described from that perspective. An alternate representation of an MCD would be a standard MCD with a single subscriber number supported thereon. Many of the functional features of a MNSD MCD are described in a U.S. patent application Ser. No. 11/375,892, with a common inventor herewith (and previously incorporated by reference hereto), which introduces the functionality associated with this specific type of mobile communication device. The structural features are described herein for inclusion with the present embodiments and application of the functionality which apply to such DNSD MCDs.

Referring now to FIG. 2, internal circuit of MNSD MCD 200 (cellular phone) comprises two circuits, circuit A 210 and circuit B 250, coupled to a central processor 245 via a MNSD switching facility 247 controlled by central processor 245. Additional numbers of circuits may be similarly supported within MNSD MCD 200, and the various embodiments of the invention may also be implemented/practiced within a single number single device MCD. MNSD MCD 200 comprises at its core a baseband digital signal processor (DSP) 202, which handles the cellular communication functions, and an applications processor 204 on which the menu and other applications (e.g., an operating system and user applications) executes/runs. Antennae 211 and 213 are respectively connected to communications module 206A and 206B, which in this embodiment, each support a different, respective subscriber number, as will be described further below. Example communications module 206A comprises circuitry for completing wireless communication (transmit and receive digital voice and data signals) via antenna 211, including for example, RF transceiver 208 and power amplifier module 210. In the illustrative embodiment, communications modules 206A/206B are coupled to an MNSD switch circuit 262 that enables switching between one communications module or the next based on which subscriber number is currently active/activated. DSP 202 is coupled to an interface application specific integrated circuit (ASIC) 214 and an audio code-decode (CODEC) 216, which provide interfaces to a speaker and a microphone (not shown), and other input/output devices provided in the MNSD MCD 200, such as a numeric or alphanumeric keypad 217 for entering commands, text, numbers, data, and/or other information. In one embodiment, MNSD MCD 200 includes a touch screen display device 218, which serves as both an output (video) device as well as an input device (via user touching of the screen). Thus, input devices also include selection buttons 219 or icons for selection menu functions and other tools and options provided by various utilities provided/executing on MNSD MCD 200. Interface mechanisms comprising a graphical user interface (via LCD display) and an alphanumeric keypad 217 and certain function buttons/icons 219 (selectable via touch screen interface) are appropriately designed to support the MNSD functionality. MCD 200 also comprises GPS/LPS detection component 224, enabling real time detection of a current geographic position of MCD 200 and any movement of MCD 200.

DSP 202 uses a flash memory 218 for code store, and flash memory 218 is enhanced with code for MCD utility 110. In alternate embodiments, the code for MCD utility 110 may be stored in (or distributed among) other storage modules within MNSD MCD 100. In the illustrative embodiment, MNSD MCD 200 may be powered by Li-Ion (lithium-ion) battery 220, and a power management module 222 coupled to DSP 202 manages power consumption within MNSD MCD 200. In one embodiment, power management is utilized to effectively reduce power to the circuit components/elements of the subscriber number not currently being utilized. When active communication is occurring on one subscriber number, the power management reduces power access to or causes the elements of the other subscriber number to go into a low power hibernation state to avoid any cross talk or interference. The response may be triggered by the MNSD utility which controls all multi-number functionality of the MNSD MCD 200.

SDRAM 224 and flash memory 226 provide volatile and non-volatile memory, respectively, for applications processor 204. This arrangement of memory holds the code for the operating system, the code for customizable features such as the phone directory, and the code for any embedded applications software in the cell phone, including MCD utility 110 (and perhaps including MNSD utility, in an alternate embodiment).

All of the above-described components are packaged within an appropriately designed external housing/casing 205. Other components may be present within MNSD MCD 200 and alternatively, cell phone may comprise different configuration of components than those illustrated herein. For example, MNSD MCD 200 may also include a visual display device (LCD display) with associated driver and a clock module.

In implementation, one or more of the novel processes supported by the software components are provided via a seamless operation with a single execution of code. Also, for simplicity in describing the invention, and as a preferred embodiment, the collective body of code that performs the various functions described herein and/or the described features of the illustrative embodiments are collectively referred to hereinafter as a specific MCD utility. References to the specific utility (or execution thereof) thus cover the entire range of functions provided by the illustrative embodiments, which occur at/on MCD 100/200.

Those of ordinary skill in the art will appreciate that the hardware and configuration thereof depicted in FIG. 2 may vary depending on implementation. Thus, the depicted example is meant solely for illustration and is not meant to imply architectural limitations with respect to the present invention. For example, it is understood that the functions of the invention are applicable to other types of communication devices and that the illustrations of MCD 100/200 and description thereof as a specialized device is provided solely for illustration. For example, mobile computing device or mobile communication device (MCD) 100/200 may be a mobile phone, personal digital assistant (PDA), a Blackberry™, an Ipod®, iPhone®, or other similar potable device with the functionality to support MCD and the described features. Similarly, while described as a portable or mobile device, several of the features are also fully applicable to a non-portable device (e.g., desktop terminal) within a networking environment with similar functionality as that of MCD 110.

Automatic Simultaneous Texting During Ongoing Voice Communication—("Text Waiting" Mode)

In a first embodiment, a "text waiting" mode is defined within a MCD 200 to enable an incoming voice call received while a voice communication is ongoing between the first communication device (MCD 100/200) and a second communication device over a first communication channel, to be answered with a text response that activates a text message exchange between the MCD and the device associated with the incoming call. The MCD 200 thus provides support for simultaneous texting and voice communication, which is also referred to herein as "talkNtext" functionality. Thus, while a first voice communication is ongoing on a first communication channel between a first MCD and a second communication device (not necessarily a mobile device), a text message exchange is also simultaneously enabled on a second communication channel between the first communication device and a third communication device (not necessarily a mobile device). FIGS. 3A-3E illustrates a series of processes by which a single communication device (MCD 100/200) simultaneously completes a voice communication with a second communication device, while completing text communication on a second communication channel for a subsequently received communication request, according to the present embodiment. Specifically, FIGS. 3A and 3B illustrate the features when applied to a single number device, while FIGS. 3C-3E illustrate the features when applied to a MSND MCD, when the second call is received on the second number, while a first voice communication is ongoing on the first number. While each communication device is illustrated as a MCD, it is appreciated that the type of communication devices to which the features of the described embodiment apply are not necessarily MCDs and any one of the illustrated devices may be non-mobile and/or may not be a cellular phone or similar MCD.

The mobile communication device (MCD 100/200) is configured with hardware and software to enable a "text waiting mode" (in addition to the conventional call waiting mode). This feature requires application of the DSP 202 (or processor) of the MCD 200 to enable a voice call to be completed on a first communication channel 315, while an incoming call 317 is signaled to the MCD 200 (FIG. 3A). At first MCD 200, the incoming call is signaled to the user (via audible, visible or tactile notification). The user is prompted with the options, via visual display of selectable options on the MCD's display 218, of selecting to initiate a concurrent text-based communication with the user of third MCD 310 from which the incoming call originated. On receipt of the selection of the text option, the MCD 200 initiates a text communication with the third device 310 over a second communication channel 322 established between the first MCD 200 and the third device 310. As indicated by the figures, the text communication may be via SMS texting, instant messenger, or some other text based communication method/protocol. With a communication device that has only a single telephone number associated therewith (FIGS. 3A-3B), the text features are enabled on the call/text waiting communication channel, without the user having to place the first communication on the first communication channel on hold while the user responds to the second communication via text-based communication. In one embodiment, an automatic notification may be generated from the first MCD 200 with a request sent to the third device 310 from which the request for a second communication originated, prompting for initiation of a text-based communication exchange. The text-based exchange then activates when the third device 310 (or the user of the third device 310) generates and submits a "yes' response that is received at the first MCD 200. Each of the above and below described functional features may be provided by MCD utility 110 executing as program code on a processing device within first MCD 110.

The dual communication (voice and text) occurs concurrently, and the users of the second device and of the third device with which the MCD 100/200 communicates are unaware that the user of the first device (MCD 100/200) is concurrently engaging in both a voice and a text communication. In the embodiment illustrated by FIGS. 3C-3E in which two different phone numbers are provided on a single device (MSND MCD), the text waiting option for an incoming call 327 received on the second number may be initiated on a communication channel 332 using the second number, while a voice communication is ongoing on the first number's communication channel 325.

The user is signaled with options that include respond with text-based communication. In most embodiments, the user is prompted to select the option of returning the call using text based functionality. This enables the user to decide how he/she wants to respond, if at all, to an incoming second call. Once the user selects the option to respond with text, a text-based communication is established on that second line concurrently with the first line being allowed to complete the voice communication. The text-based communication enables the user to enter text using his keypad, touchpad, and/or other external text input mechanisms associated with the communication device. A texting availability notification is transmitted back to the second number to inform the user of the second device that a voice communication cannot be initiated but that a text communication exchange is acceptable.

In one embodiment, the text-based communication is programmed for specific numbers (e.g., wife, kids) from which the second incoming communication request is received. Thus, certain numbers are pre-programmed to automatically get routed to a text-based communication (e.g., short message service (SMS) or instant messenger) without the user of the first device having to select that option for the incoming voice call. The phone number (or other identifier) of the incoming call is briefly displayed (as a caller ID), and the MCD utility 110 indicates the number from which the call is being received and then immediately transfers the call to the text-based communication method.

Also, in one embodiment, illustrated by FIG. 3E, the user of first MCD 200 may be prompted to switch the first call to text-based communication 335. In some instances, where specific numbers are pre-programmed as a priority number, calls received from those numbers are given voice response priority, while an ongoing call is switched to text-based communication, following pre-program protocols for notifying the communicating party on the second/third device. Also, with a multiple number device, calls on a first subscriber number (of the first communication device) may be automatically given "voice priority" for responding to those received calls, while calls on the second subscriber number are awarded only text priority (level), when there is an ongoing call on the first (priority) number. When a switch of an original voice call to text occurs, the user may then initiate a voice call (response) on the communication channel 337 with the third device from which the incoming call is received 337 (and the next subscriber number of MCD 200).

The various features associated with the text waiting mode may be provided with/programmed within the communication device at the time of manufacture or provided post-manufacture via a downloadable applet/utility that is executed on the processing component of the communication device. In one embodiment, the user of the first device is able to toggle the voice communication to the second channel or over the second phone number, while automatically (or selectively) transferring/changing/reconfiguring the original voice-based communication exchange to a text-based communication. The required notifications, requests and response may be sent to/between the different devices automatically, based on a pre-programmed functionality.

Figure 4:
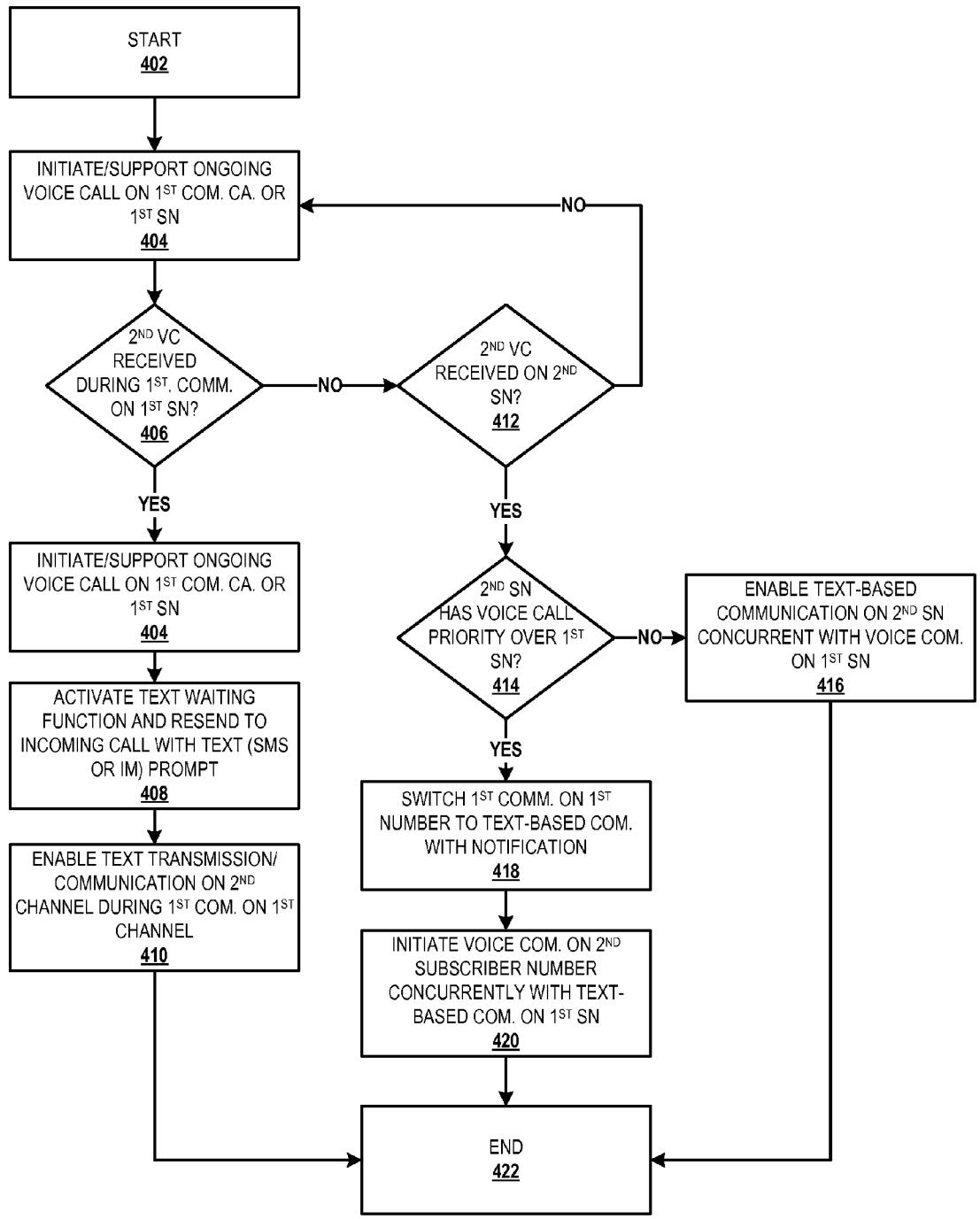
FIG. 4 is a high-level flow diagram of the method by which an incoming second voice call received at a MCD is handled simultaneously as a text communication on the second communication channel when a communication device supports text waiting functionality, in accordance with one or more embodiments.

FIG. 4 is a high-level flow diagram of the method by which an incoming second voice call is selectively or automatically converted to a text based communication and handled simultaneously as a text communication over the second communication channel while the original voice communication over the first communication channel is ongoing. The present embodiments are applicable to any MCD that supports both voice and text waiting functionality, in accordance with one or more embodiments herein. The method begins at block 402 and proceeds to block 404, which indicates initiating of an ongoing voice call on a first communication channel or with a first subscriber number. The utility 110 detects receipt of a second voice call, and determines at block 406 if the second voice call is received on the first communication channel of the first subscriber number (on which the current ongoing voice call exists). When the second incoming call is received on the first subscriber number, the utility activates a text waiting function/feature and responds to the incoming call with a text based communication message (block 408). The text communication may be a hello response or a query whether a text communication is appropriate or acceptable to the originator of the second voice call. Following, the MCD/MCD utility 110 enables text transmission and communication with the third device on a second communication channel while the first voice communication is ongoing on the first communication channel (block 410). While described as a first communication channel and a second, different communication channel, it is appreciated that the MCD may support duplex communication over a single communication channel whereby both the voice and text communication are supported on the single communication channel.

Returning to block 406, when a second voice call is received on a second subscriber number (in an MSND MCD implementation), as determined at block 412, MCD utility 110 determines if the second subscriber number has voice call priority over the first subscriber number (block 414). In response to the second subscriber number having priority over the first subscriber number, MCD utility switches the first voice communication to a text-based communication and issues a notification to the second device 305 of the switch over (block 418). MCD utility 110 then initiates the voice communication over the second subscriber number, concurrently with the text based communication with the first subscriber number (block 420). In response to the second subscriber number not having voice call priority, MCD utility 110 enables a text-based communication on the second subscriber number concurrently with the ongoing voice communication on the first subscriber number. The process then ends at block 422. If is further appreciated that the above method may be expanded to include several levels of implementation beyond those indicated in the flow chart, including some which have been described herein without specific illustration in the provided figures. These features are also covered within the general concepts of the embodiment and claims presented herein.

Thus, according to this first embodiment, a method is provided that is performed within a first mobile communication device (MCD) having functional components for completing both a voice communication and a text communication. The method comprises: the first MCD receiving an incoming request for a second voice communication with a third device while a first voice communication is ongoing with a second device; activating a text messaging function of the first MCD in response to receiving the incoming request; and enabling text-based communication with the third device while the first voice communication is ongoing. Other embodiments of the method further comprises: determining a relative priority of the first voice communication and the second voice communication by determining if the second voice communication request is received from a third party number that is pre-established as a higher priority number that a second party number with which the first voice communication is being conducted; and in response to the second voice communication having a higher priority than the first voice communication, automatically toggling the first voice communication to a text-based communication and activating the second voice communication with the third device. The method further comprises, when the first MCD is a MSND MCD, and the second voice communication request is received on the second subscriber number while the first voice communication is ongoing on the first subscriber number: determining if the second subscriber number has a higher pre-established priority than the first subscriber number; and automatically toggling the first voice communication to a text-based communication and initiating the second voice communication on the second subscriber number in response to the second subscriber number having a higher pre-established priority than the first subscriber number. One embodiment provides the method functions within a MCD 200, while another embodiment provides the method functions as a program product that is stored on a machine readable medium and executed on the MCD 100/200 to perform the method functions.

Dynamic Area Code Determination and Automatic Pre-Pending of Area Codes to Complete Requested Communication Connection from Mobile Communication Device In a second embodiment, the MCD utility 110 enables MCD 100/200 to dynamically provide a correct area code for a number being dialed or texted from the MCD, when the number entry (or the contact data) does not include the area code associated with the phone number. When making an out-of-local-area call to a number stored in the phone contacts' database or on the subscriber identify module (SIM) card, where the phone number does not include the corresponding area code (associated with the contacts specific geographic or toll location), current technology prevents the call from being completed. The user of a conventional communication device (e.g., cell phone) is provided with a message that the call cannot be completed or the text cannot be transmitted because the number is incorrect or not recognizable. This forces the user of the conventional communication device to reenter the entire number using the keypad or touch screen and, if a text message, was initially attempted to the incomplete number, to reenter the entire content of the text after entering the corrected, complete number. Often, numbers stored in a contacts database are not identifiable to the user who simply selects the name to whom he/she desires to communicate. The only way to actually correctly enter the digit number, including the area code, is for the user to open the contact, by going through the digital phone book, memorizing or writing down the 7 digits stored, identifying the correct area code from memory or by researching the area code, and then physically redialing the entire 10 digit number with the correct area code. A similar problem is encountered when texting from/within a different area code than the home area code of the originating device. However, the user has to go through the above steps and then add the additional step of retyping (or opening, copying and pasting) the text message that was initially entered in the device.

The presently described embodiment substantially eliminates solves the problem of missing area codes within a contacts database and with calls originating within a determinable are code. The embodiment is implemented with existing phone entries on devices that do not currently allow/support calls made to numbers outside of the home area code without the user first entering the entire 10 digit call number. MCD utility 110 provides enhanced functionality to overcome this problem with an existing phone book of seven digit numbers from different area codes. For example, without the enhancements provided by MCD utility, a mobile phone with local area code of 512 (Austin) would not be able to dial a Houston number (are code 713) that is stored with a Houston contact within the mobile phone by dialing just the seven last digits of the phone number (i.e., without the 713 area code). Likewise, the caller would not be able to call a number in his home area code (512) while the caller is physically located in Houston with his phone. The caller would have to first dial the 512 area code in front of the seven (7) digit local number, even for a number the caller has just rang while he was in the Austin airport about to board a flight to Houston. While in Austin, for example, dialing the seven digits ensures that the caller reaches his Austin contact without any concerns/considerations about the home area code. With the exception of cities requiring dialing of ten digits (including one of multiple provided area codes) for all dialed numbers within that entire city, most people in seven (7) digit local phone dialing areas typically enter only the last seven digits within their contacts' (phone number) database, and thus only seven digits are redialed when the contact is later selected to initiate a phone call to.

Thus, the present embodiments recognize that one problem with out-of-area code calls that are placed from the electronic phone book/contact list stored on the cell phone is that when those numbers are not stored with the entire 10 digits (i.e., area code first, followed by local seven digit phone number), the user of the device is unable to complete a call/text from his phone using his/her contact list/phonebook. The current cellular services do not process numbers that are outside of the local area code and instead provide the user with an error message requesting the user enter the correct/complete number (including the area code). However, entering the area code requires the user to enter the entire 10 digits, and often the user has to first write down the seven stored digits from his/her phonebook/contacts list, hang up the phone, determine what the correct area code is, and then manually re-initiate the call by punching in or voicing (for voice enabled calling) the entire 10 digits.

Also, when a text is sent to a seven digit number, the user is not always made aware that the text cannot be delivered until some time afterwards, when the user may not actually be paying attention to the device. Thus, text messages that are assumed to have been delivered to the recipient device (having selected the contact name as the recipient of the text) may be stuck in a local memory of the sender or simply not delivered with an error message notification provided to the sender indicating the failure of the message delivery because the sender did not enter the area code along with the number to which the text is intended to be sent. Some services do not allow text messages even to a local number without the area code being entered with the number.

The embodiments described herein thus provide a plurality of methods, an enhanced MCD 200, and application program products for execution on an MCD 200 that provides dynamic area code determination and automatic pre-pending back-filling of area codes to complete an initiated voice or text communication from the MCD. The embodiments provide the features to the MCD both while the MCD is within a home area code location and a non-local area code. According to one embodiment, the mobile communication devices are programmed with an area code pre-pending/backfilling utility, which is a component of MCD utility 110. MCD utility 110 executes on MCD 110 to provide the following method functions: (a) user-initiated voice, keypad or touchpad backfilling of area code to initiate/transmit a voice call or text message that was initially attempted with entry of a seven digit number; (b) generating unequivocal, simultaneous feedback to (a user of) the MCD 200 of failure to enter an area code for out of area voice call or text message; (c) dynamically determining a local area code for calls to numbers not within the MCD's phone directory or contacts list by dynamically accessing a cell tower or other localized information source for retrieval of a local area code for calls initiated from a foreign are code (i.e., not the home area code), with triangulation, if necessary, to determine the closest tower; (d) automatically filling in local/home base area code for all calls placed to numbers within the local area, and displaying a prompt following completion of the call to enable automatic updating/pre-pending of a correct area code to the stored seven digit number of the contact; (e) automatically filling in area codes for each number stored in contacts and/or on the SIM once completion of a successful call to that number is identified (with a prompt to the user with the area code requesting the user to indicate whether the user wants to associate the area code to the number or select a different area code);

Other aspects of the method comprise: (f) providing an unequivocal feedback asking for entry of just the area code when the call is initiated outside of the correct area code so that the caller does not need to type in the last seven digits again; (f2) re-initiating the call/text by redialing the 10 digit number having first received the 7 digit number (by keypad or from contacts list) followed by receipt of only the area code, in response to the unequivocal prompt for the area code information; (g) automatically defaulting to the phone's home area code as a first option when a call is initiated while the MCD 200 is outside out of the home area code location and providing the caller with an option to change the area code from the home area code to a correct second area code. This feature is provided because phone users are more likely to dial/utilize only the seven digits for local numbers (within their home area code) even when the user is located outside of his/her home area code. Thus, most seven digit dialing would be associated with a number within the user's home area code.

Yet, additional aspects of the method comprise: (h) providing the user of the MCD 200 with an opportunity to say yes to a prompt/suggestion of what may be the area code for the number being called or texted; (i) if a seven digit number is not in the contacts database (such as a user dialed seven digits), assuming the number is for the current/local area code in which the phone is located and automatically pre-pending the area code received from a search conducted on the network, with visual confirmation of the are code by the user; (j) using a previous area code for a most recently concluded call for a new call in which the area code is not immediately entered, and prompting the user to accept that the call is also within the same area code as the previous call; and (k) for locations with multiple area codes, presenting a selectable list of each area code or each complete 10 digit number for selection by the user of the correct area code-seven digit number combination.

Figure 5C:
FIGS. 5A-5F provide illustrations of several screen views of the MCD on which different prompts are automatically displayed to enable selection/entry of a correct area code to pre-pend to a previously entered seven digit phone number, in accordance with described embodiments.
Figure 5F:
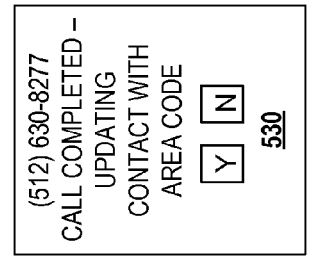
Figure 5B:
Figure 5E:
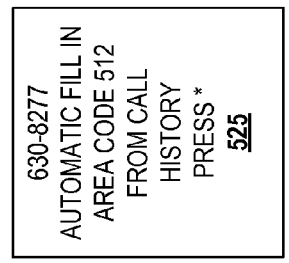
Figure 5A:
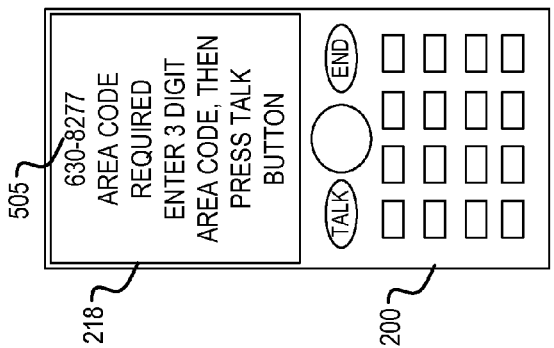
Figure 5D:
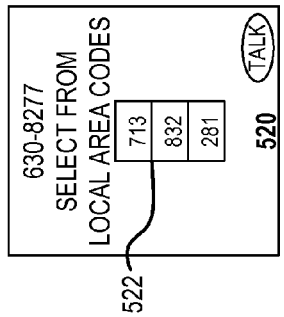

FIGS. 5A-5F provide illustrations of several screen views of the MCD display 218 on which different prompts are displayed to enable selection/entry of a correct area code to pre-pend to (or include in front of) a previously entered seven digit phone number, in accordance with described embodiments. Beginning with FIG. 5A, a seven digit number is entered on MCD 200 and displayed on display screen 218 of MCD 200. Also displayed below the seven digit number is a message/notification 505 indicating that the area code is required to complete the phone call. The message/notification 505 indicates that the user has to enter the three (3) digit area code to complete the call. In the embodiment of FIG. 5B, the utility 110 determines the area code and then generates a prompt 510 requesting the user confirm the dynamically determined area code or enter a different area code. FIG. 5C then illustrates the utility initiating a call to the local area code as a default area code and indicating 515 that the local area code of the location in which the MCD is located is being used to complete the call. FIG. 5D illustrates the embodiment in which a listing of available local area codes 520 is presented to the user following entry of the seven digits in a location that has multiple area codes. FIG. 5E illustrates the messaging or notification 525 to the user via display 218 that MCD utility 110 is automatically filling in the area code based on a call history or a historical table of area code usage with specific seven digit numbers. Finally, FIG. 5F provides the interface 530 that prompts a user to accept an update to the stored contact to include the area code pre-pended to the seven digit number currently stored with the contact. This interface is generated after completion of a call/text communication in which the area code was required to be entered or was dynamically determined by MCD utility 110 prior to initiating the communication.

In one embodiment, the search for the correct area code involves: checking the contact list/phone books for similar last seven digit numbers and prompting the user if the number is found correct; checking the call history (both received and made calls) to see if the number was previously used/received in a communication or attempted communication with the MCD 200. One embodiment provides the above presented method functions within a MCD 200, while another embodiment provides the method functions as a program product that is stored on a machine readable medium and executed on the MCD 100/200 to perform the method functions.

Figure 6:
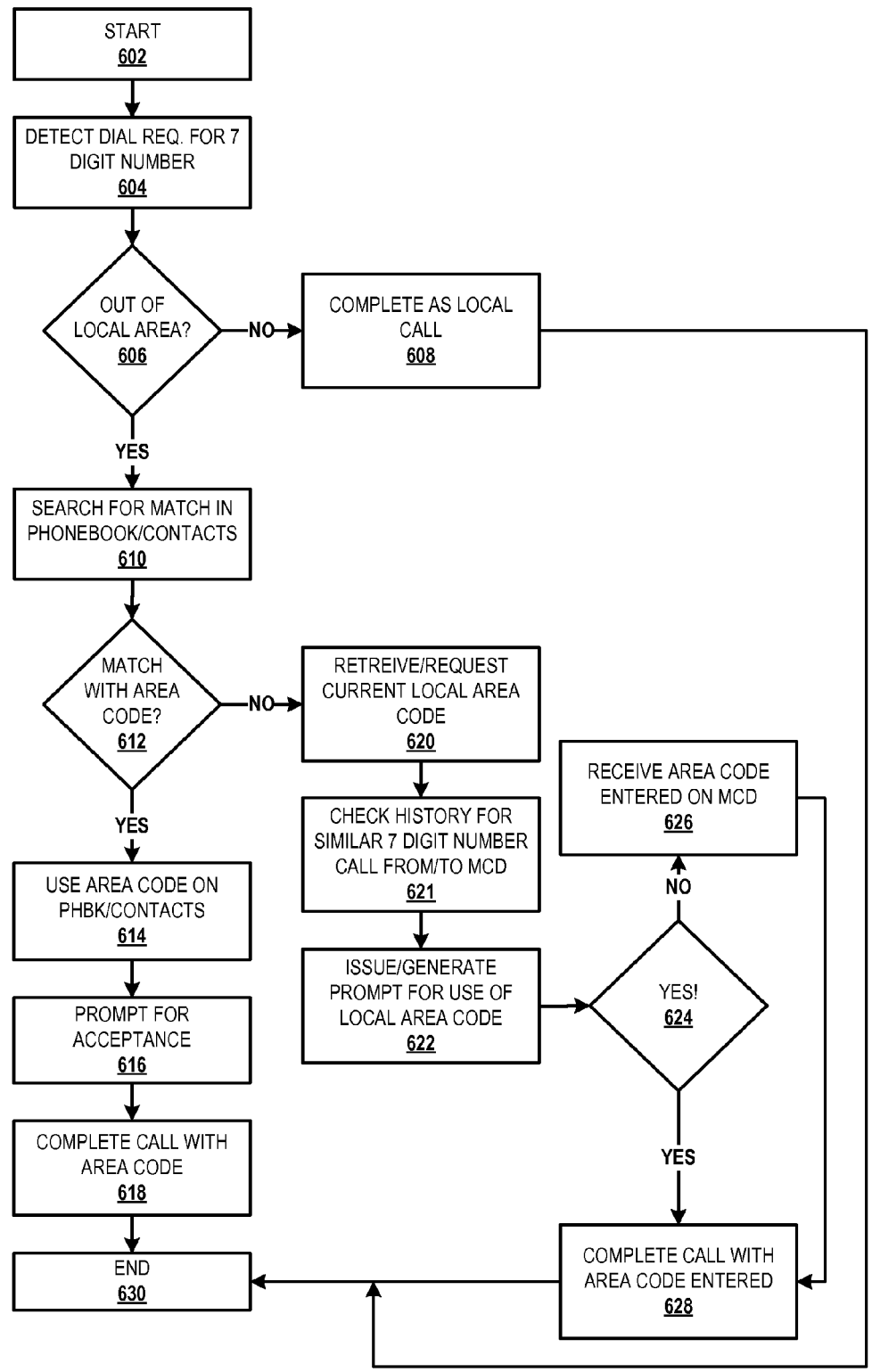
FIG. 6 is a high-level flow diagram of the method by which the MCD automatically detects and/or dynamically pre-pends/assigns an area code for a phone number to which a voice or text communication is desired initiated, in accordance with one or more embodiments.

FIG. 6 is a high-level flow diagram of the method by which the MCD utility automatically detects and/or dynamically assigns an area code for a seven digit number to which a communication is initiated, in accordance with one embodiment. The process begins at block 602, and proceeds to block 604 at which the MCD utility 110 detects a dialed call or a text that includes a seven digit number. At block 606, utility determines if the communication was initiated while the MCD 200 was outside of its home area code location. If the call is being placed within the based area code location (and is not a text message), the MCD completes the call as a local call (block 608). Additional prompts may be provided by MCD utility to update the seven digit number in stored contacts with the home area code.

Returning to decision block 606, when the call is to a number with a "foreign" area code (i.e., not a same home/local area code with the MCD's phone number), MCD utility 110 initiates a search within the MCD's phone book or contacts for the area code of the number dialed/entered (block 610) If, as determined at block 612, MCD utility 110 finds a match with a number for one of the stored contacts, then MCD utility 110 selects the area code retrieved from the stored phonebook/contact. MCR utility 110 displays the area code and/or ten digit number and prompts for acceptance of the area code (block 616). This prompt is optional as locating the complete ten digit number in the phonebook/contacts would likely mean that the area code is valid. MCD utility 110 completes the call with eharea code from the phonebook/contacts (block 618).

Returning to decision block 612, if the area code is not found within the phonebook/contacts, MCD utility 110 retrieves the area code of the current location in which the MCD is located (block 620) (by checking with the local relay/wireless tower, in one embodiment). MCD utility 110 also checks the recent call history or the stored call history (of different area codes utilized) for a similar seven digit number placed from or received by the MCD 200 (block 621). MCD utility 110 then generates a prompt requesting the user select a local area code for use with the seven digit number (block 622). If MCD utility detects that the user has selected the option to use the local area code (block 624), MCD utility 110 completes the call/text with the local area code pre-pended to the seven digit number (block 618). Otherwise, MCD utility receives an area code entry from the user input at MCD (block 626) and MCD utility 110 enables MCD 200 to complete the call with the entered area code (block 628). The method terminates at block 630. In one embodiment, rather than simply using the local area code, MCD utility displays a selection of area codes that are applicable for use in the present location and receives a user selection of which area code to pre-pend to the seven digit number. It is instructive that while the described embodiments are presented with a seven digit local toll and a three digit area code, the features described herein are also applicable to different lengths of numbers and area codes and may even be extended to cover different country codes, where appropriate.

In one embodiment, in which a multiple number device (MSND MCD 200) is utilized, the area code on the first number may be a different area code than that of the second number. Each number then provides its specific sequence or determining which area code to pre-pend to called numbers, with the local area code being the default area code on each number, respectively. The home area code of the specific number (first subscriber number or second subscriber number) from which the call originates is then utilized in the evaluation of the correct area code and with the prompts generated to the user of the device. This functionality enables two different subscriber numbers having different area codes to utilized seven digit numbers in their respective area codes without having to program the area codes in the contact list of numbers or the phone book utilized for that specific subscriber number. The originating subscriber number's area code is then utilized as the default area code. Thus, the single device allows for numbers having different area codes to be supported on the same device without requiring area code level (10 digit) entry for all numbers during placement of calls and updates to phone book entries and contacts lists.

Figure 7:
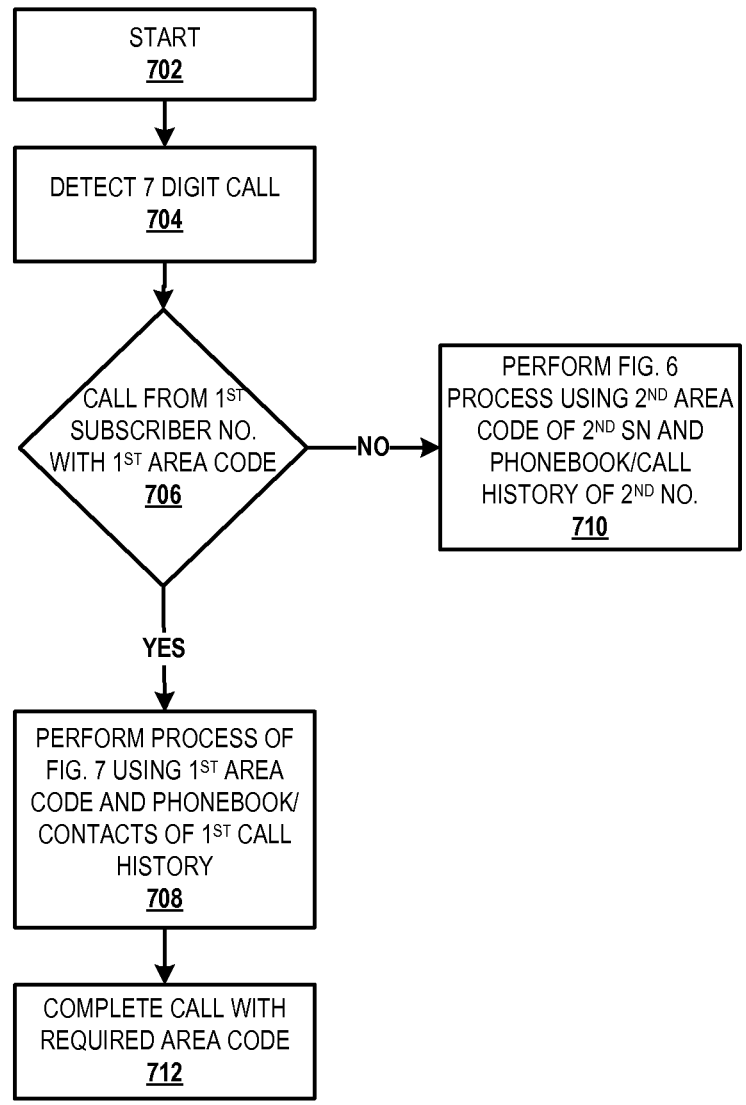
FIG. 7 is a high-level flow diagram of the method by which the MCD dynamically determines and automatically assigns an area code for a seven digit number to which a voice or text communication is initiated within a multiple number single device (MNSD) MCD in which each number has a separate home area code, in accordance with one or more embodiments.

FIG. 7 is a high-level flow diagram of the method by which the MCD utility automatically detects and/or dynamically assigns an area code for a seven digit number to which a communication is initiated within a multiple number single device (MNSD) MCD in which each number has a separate home area code, in accordance with one embodiment. The method begins at block 702 and proceeds to block 704 at which MCD utility 110 detects an entry of seven digits or a selection of a contact phone number comprising only seven digits to place a call or send a text message. MCD utility 110 determines at decision block 706 whether the call/text was being placed on the first subscriber number or the second subscriber number of the MSND MCD 200. When the call/text is being performed using the first subscriber number, MCD utility 110 performs the method process of FIG. 6 utilizing the parameters and data associated with the first subscriber number (block 708). Thus, MCD utility 110 performs various processes of FIG. 6 utilizing the local/home area code of the first subscriber number, the phone book and contacts of the first subscriber number, and the call history associated with the first subscriber number. Likewise, When the call/text is being performed using the second subscriber number, MCD utility 110 performs the method process of FIG. 6 utilizing the parameters and data associated with the second subscriber number (block 710). Thus, MCD utility 110 performs various processes of FIG. 6 utilizing the local/home area code of the second subscriber number, the phone book and contacts of the second subscriber number, and the call history associated with the second subscriber number. It is further contemplated with some embodiments, MCD utility 110 also performs these processes with the parameters and data of the alternate subscriber number, when, for example, a check of the second subscriber number is performed when the check of the first subscriber number does not provide the correct area code for the call/text number, and vice versa.

In addition to the describe methods, illustrated in part by the flow charts, one embodiment provides the above presented method functions within a MCD 200, while another embodiment provides the method functions as a program product that is stored on a machine readable medium and executed on the MCD 100/200 to perform the method functions.

Enhanced Editing Features for Applications on Mobile Computing Devices

Features described herein are related to cross-referenced U.S. application Ser. No. 12/697,742. The entire content of that application is incorporated herein by reference. With the reduced viewable space provided on most mobile computing devices, such as netbooks computers, laptop computers, smart phones and personal digital assistants, most users of these devices find it very difficult to edit documents and keep track of the edits being made. Several of these devices come equipped with advanced user applications such as MS Word® and MS Excel® (as a part of Windows Mobile® package/suite of mobile computing software, for example), and others (MS Word, MS Excel and Windows Mobile are trademarks of Microsoft Corporation). In addition to the above limitation, one additional limitation found with using these advanced applications is that the screen scrolling functionality of these devices is limited by the small size of the devices. Thus, while a large number of users purchase these devices with the intent of completing on-the-go computing, most users of these smaller machines/devices become frustrated when trying to review and/or edit very large documents and/or spreadsheets. Conventional editing functions, such as cut and past functionality lends itself to some ambidexterity and is very cumbersome with these mobile device executed applications.

A third embodiment described herein provides enhanced editing functionality for applications on mobile computing devices. Thus, this embodiment discloses methods and computer program product that provide (a) an automatic tag, cut-and-paste functionality and (b) tagged-order content re-arrangement functionality, for efficient editing of content by a user of an executing application on an MCD 100/200. The automatic tag, cut-and-paste functionality, which is referred to as a retrieve with insert functionality or a jump insertion functionality enables a MCD user to automatically populate a pre-selected and marked ending location/destination with content that is selected (copied or cut) from an original/start location from the same document or from a different document or application. The tagged order re-arrangement allows the user to tagged and number a plurality of multiple pieces/portions of a complete document (e.g., sentences) and simply re-arrange them into a different ordered sequence with selection of a re-arrange icon or function. Each of these functions is enabled within MCD 100/200 via execution of MCD utility 110 on processing components of MCD 100/200.

FIGS. 8A-8E illustrates a first sequence of graphical user interfaces that may be generated during implementation of one or more advanced editing functions, in accordance with one or more embodiments. The sequence begins with a first document interface 805 of FIG. 8A showing a text document having a series of different text (text A, text N), with corresponding location within the document of locations A and location X. At FIG. 8B, MCD user marks an insertion point (identified by an asterix *) within document interface 810 corresponding to a destination point for insertion of text to be later selected by the user. More than one insertion point may be marked in one implementation. FIG. 8C then illustrates a scroll function, via scroll bar 816 and arrows indicating an upward scrolling through the document content within document interface 815. Specific content, content M 817, which is located a point Y within the document is shown selected (via highlighting). The selection is performed by a user, who may either elect to cut or copy the content. Once the content is selected, MCD utility detects the selection (following the initial marking of the insertion point(s)), and MCD utility 110 automatically generates a listing 822 of each available insertion point to place/insert the selected content and displays the list for selection of an insertion point within document interface 820 (FIG. 8D). The user selects the desired insertion point and the MCD utility responds to receipt of the selection of an insertion point by automatically inserting the selected content M 817 (or a copy of the selected content M 817) into the previously marked insertion point. As provided by document interface 825 of FIG. 8E, the content M automatically populates the insertion point without the user having to scroll back to location X and then pasting the content M at that location (x+1).

A user application is enhanced with code elements that enable advanced editing of its displayed contents. With these code elements in place, a user is enabled to first mark an end location/destination, then select (copy or cut) the contents desired to be relocated in that location. Following the selection, the user then automatically populates the end location with the content by selecting an insert function displayed/provided as a selectable option to the user.

In one embodiment, the content is automatically populated upon selection following an initial selection by the user of the ending/target location. Utilizing this functionality, the user identifies the location to which content is to be moved and is spared the time and efforts of having to scroll through the document backwards/forwards while remembering the specific location, once the content is selected. Moving content in this manner is substantially more efficient than a conventional cut and paste operation that requires scrolling to the paste location in the document after the content is cut from another location.

FIG. 10 illustrates the method by which the processes of the above describe embodiment are implemented. The method begins at block 1002 and proceeds to block 1004 at which MCD utility 110 detects selection a menu option of function to mark an insertion point within the document (or spreadsheet) of a user application. The selection or marking may be performed by displaying an editing menu and selecting the content insertion menu option or selecting an available/displayed content insertion icon, which are presented as one of the available editing functions for the particular document or application. The MCD utility 110 marks the location and assigns a specific marker/tag to the location (block 1006). The MCD utility 110 later detects selection of content from another location within the same document, another document of the application or another compatible application altogether (block 1008). MCD utility 110 then presents a display of available, previously marked insertion points in the specific document(s) marked with the insertion points (block 1010). MCD utility 110 determines at decision block 1012 whether one of the insertion points was selection while the content was selected. If no insertion point is selected, then it is assumed that the content selected is not intended to be moved to the marked insertion point via the methods of the present embodiment. When MCD utility 110 receives a selection of an insertion point, MCD utility 110 inserts the content into the insertion point marked within the document (block 1014). The process then ends at block 1016. In one embodiment, the content may be selected from a different document or different application from the document in which the insertion point is initially marked. Other features and functionality are provided in the related application and are incorporated herein by reference.

In addition to the describe methods, illustrated in part by the flow charts, one embodiment provides the above presented method functions within a MCD 200, while another embodiment provides the method functions as a program product that is stored on a machine readable medium and executed on the MCD 100/200 to perform the method functions.

Content Re-Arrangement within User Applications

FIGS. 9A-9D illustrates a second sequence of graphical user interfaces that may be generated during implementation of other advanced editing functions, in accordance with one or more embodiments. Specifically, FIGS. 9A-9D illustrate a series of user interfaces of a content based application that depicts the tagging of content and ultimate re-arrangement of the tagged content in a tagged sequence order. In one embodiment, selected content within a document or across multiple documents may be assigned alphanumeric tags indicating the order in which the content is to be presented in a final document or within the same document. Thus, a first sentence (or a sub-sentence, phrase, clause, etc.) or a first paragraph (or a plurality of sequential paragraphs) is tagged with a first number from one to N, where N represents the largest integer number of individually tagged content that may be re-arranged within the particular implementation. Following, a second sentence (or a sub-sentence, phrase, clause, etc.) or a first paragraph (or a plurality of sequential paragraphs) is tagged with a second number within the range of one to N, but not the same number as the first number. This tagging of content may then be continued for N different content, with each assigned a unique number from one to N.

As a specific example, sequentially ordered content A, B, D and G, in an original document, are tagged as 4, 3, 1, 2 and then automatically re-arranged as D, G, B, A within the document or in a new document with a simple selection of the re-arrange function of MCD utility 110. A three way cut and paste of the content would otherwise be required to complete this re-arrangement on the reduced screen provided by the MCD 100/200. FIG. 9A illustrates a first document interface 905 in which text A, text B, text D and text G are initially arrange in ordered sequence, location 1, 2, 4, and 7 (in alpha-numeric order with each original content assigned a letter of the alphabet in increasing sequence). Within document interface 905 each of the five content has been tagged with a sequence ID for re-arrangement of the content relative to each other. Thus, foe example text A at original location 1 is tagged with sequence number 4, while text G, with original location 7 is tagged with sequence number 2.

As provide at interface 910, MCR utility 110 provides a series of selectable editing functions that enables a user to re-arrange, cut, and/or insert content within a document and provide a resulting new document or a re-arranged current/existing document. With the selections/tags placed on specific content in interface 905, when MCD utility 110 receives a selection of the re-arrange function (within the existing document), MCD utility 110 generates the resulting document in interface 915 (FIG. 9C) in which the tagged content are re-arranged in sequential tagged order. As shown, the content is rearrange as text D, G, B and A, followed by the remaining content of the document minus the re-arranged content. The numbered re-arrangement can be modified after the initial tagging of content. Also, automatic updating of a sequence is enabled when an earlier ordered number is applied to a newly tagged content or to a content that was previously tagged with a higher order number. FIG. 9D illustrates an interface generated when MCD detects a conflict between a current tag and a previously assigned tag. In this illustration, MCD utility 110 presents the user with options for resolving the conflict, including forcing the selection of the newly tagged content (thus increasing the sequence order o of the previously tagged content) or changing the tag number of the newly tagged content to a different number that is not a conflict with any of the previously assigned tags.

In one embodiment, the ability to tag specific content is provided as a selectable option within the drop down menu options, on right click of the pointing device or opening of a menu option within the top level edit function of standard documents. Other mechanisms for accessing and selecting the option to tag specific content and the further option to select a specific number within the allowable range to assign to the specific content are contemplated and fall within the scope of the invention. With the multiple content tagged with unique numbers, the user is then able to select a sort and re-combine function, which provides the following features: (a) sequentially arrange the individual content in the tagged order (i.e., based on the actual number tagged to the specific content); (b) create a new document with the re-arranged order of the content, perhaps as a "re-arrange version" of the original document (this preserves the original document in case the original document is required); and (c) allow targeted insertion and ordering of different selected content using the jump insert function (as described herein). In one embodiment, a marked-up version of the original document is created when the track changes feature of the application is activated prior to performing the re-arrangement. The marked up version may show the tagged number of each of the content that was moved/re-arranged. In one embodiment, the tags are highlighted within the document and a mouse over of the tag provides a page, paragraph, line number, or other mechanism which identifies the original (and perhaps the new) location to which the content is being moved.

While the tags are described and illustrated as integer numbers, it is contemplated that other methods for tagging the content may be provided. For example, an alphabetized numbering scheme may be utilized (A-Z), or a graphical indicator of the relevant importance/priority of the content (where a pre-established ordering scheme is provided/defined/programmed based on content relevance or priority). Pre-defined specialized icons may also be utilized in place of actual numbers or letters.

With the tags associated with their specific content and viewable within the document, the user is able to selectively change the assigned number to a particular content. In one embodiment, this change is effected by selection of the tag and simple insertion of the correct number in placed of the original number (so long as there is no conflict in numbers). If the user attempts to assign a previously assigned number to a second content, an error message is displayed indicating that the number has been previously assigned. In one embodiment, the remaining available numbers may be displayed to the user when the user selects the content to apply a tag to. In another embodiment, the user may jump to the content previously assigned the number that is desired to be assigned to the second content and re-assign the tag number of the first content. Then, the software allows the user to jump back to the second content and assign the number previously assigned to the first content. In one embodiment, the user may forced the assignment of the previously assigned tag to the second tagged content, and the utility then immediately prompts the user to select a different tag number for the first tagged content. This conflict of numbers may occur, for example, where the first content is initially assigned the number 1, and a subsequent content is desired to be first in the re-arranged content order. Rather than having to first re-assign the first content's tag number, the utility allows the user to force the tag number 1 on the subsequent content, and the utility then prompts the user to select a different tag number for the first content.

FIG. 11 illustrates a high-level flow diagram of the method by which advanced editing functions are completed on MCD 100/200, in accordance with one embodiment. The method process begins at block 1102 at which MCD utility 110 detects the tagging of selected content within one or more documents and/or applications and assigned the specific sequence numbers to the selected content. At block 1104, MCD utility 110 resolves any conflicts with the assignment of sequence numbers to selected content, using prompts to the user and forced assignments or re-assignments of sequence numbers. At decision block 1106, MCD utility 1110 determines if a selection that triggers the re-arrangement of tagged content is detected or received. When MCD utility 110 receives/detects selection of the re-arrangement function (while there is more than one content that is tagged with a sequence number), MCd utility 110 prompts for and monitors for selection of a new document option (block 1108). If MCD utility 110 receives a selection of the new document option, MCD utility opens a new document and presents the content in the sequence order within the new document (block 1110).

Otherwise, MCD utility 110 presents the tagged content in the sequence order within the current document (block 1112).

Thus, the illustrative embodiments of the flow charts present, in a communication device having a display device and a processor executing a content based application with editable content that is viewable on the display device, a method comprising: receiving a selection of an insertion point at a first location within the editable content; recording the first location of the insertion point; when a subsequent selection is detected of a specific content at a different location within the editable content, generating a prompt to enable selection of the first location as the insertion point to which the specific content is to be inserted; and responsive to a selection of the insertion point, automatically inserting the specific content into the first location within the editable content. In another embodiment, the method comprises: receiving a selection of a plurality of different content within the editable content; receiving a corresponding sequence tag with each of the selections of the different content; assigning a unique sequence tag to each of the selections; and responsive to receipt a subsequent entry to arrange the different content, automatically re-arranging the different content in an order that is based on the sequence tag associated with each of the different content.

In addition to the describe methods, illustrated in part by the flow charts, one embodiment provides the above presented method functions within a MCD 200, while another embodiment provides the method functions as a program product that is stored on a machine readable medium and executed on the MCD 100/200 to perform the method functions.

Automatic Toggle to Voice-to-Text Based Communication Mode on Detection of Movement of Mobile Communication Device According to one embodiment, a mobile communication device, such as a cellular phone that supports both voice and text based communication is designed/manufactured with a movement sensor, which enables sensing of movement over a pre-selected rate of speed (e.g., number of miles/km per hour). The methods of determining the rate of speed may be a complex determination that involves tracking the wireless signal strength from adjacent towers in the vicinity, or alternatively, the method may involve a simple determination by evaluating relative GPS positions over a short time. In one embodiment, rather than rely on actual movement, a vehicle may be designed with a Bluetooth® sensor and communicator that automatically determines that the mobile communication device is in a vehicle whose engine is turned on. The vehicle's Bluetooth voice system would then immediately take over the voice functions of the phone (assuming the phone is paired to the vehicle), and then determine when the vehicle was moving (versus being in a parked position). Once the vehicle moves from a parked position (or perhaps as soon as the vehicle is turned on), the vehicle BT voice system transmits a safety signal/notification to any phone devices (perhaps via Bluetooth) located proximate to the driver's seat. Any phone that is within range of the limited space signal (around the driver's seat) is then triggered to shut off any manual texting functions of the phone. This shutting of the texting functions may be completed by one or more of, but not limited to, preventing texting functions from being accessible on the phone, or preventing the phone's alphanumeric buttons or other input buttons from being operational, or shutting off the screen view on the phone. Thus, no texting is allowed from the phone, as the phone's user is presumed to be driving because of his/her location to the driver's seat.

All text based operation of the phone are thereafter only permitted to be conducted via voice to text option, whereby the user may voice words, received audio feedback of the recorded/translated words, and then the phone device transcribes the voice into text and forwards the text to the selected recipient's number/device. Shutting the texting function down may also involve blackening out the viewable screen of the phone so that the user cannot look at the translations while voicing the message.

In one embodiment, warning messages are provided to the user concerning the dangers of driving while talking or texting, as a component of the activation of the voice-to-text feature. Accordingly, passenger use of texting is permitted while no texting features are permitted for a driver of the vehicle. The use of a mobile device-based (localized) movement sensor enables the device to independently shut off the texting feature when the device is travelling past a pre-selected rate of speed. In one embodiment, specific travel modes are available for pre-programming by the phone user, including train mode, for example, which then enables the user to access the texting functions while seated on a moving train.

In one embodiment, a series of checks on the device itself may be used to ensure that the phone user is not at the driver's seat, by having the user depress certain buttons from a location away from the driver's seat while also depressing a button on the front driver's side of the vehicle.

Figure 12:
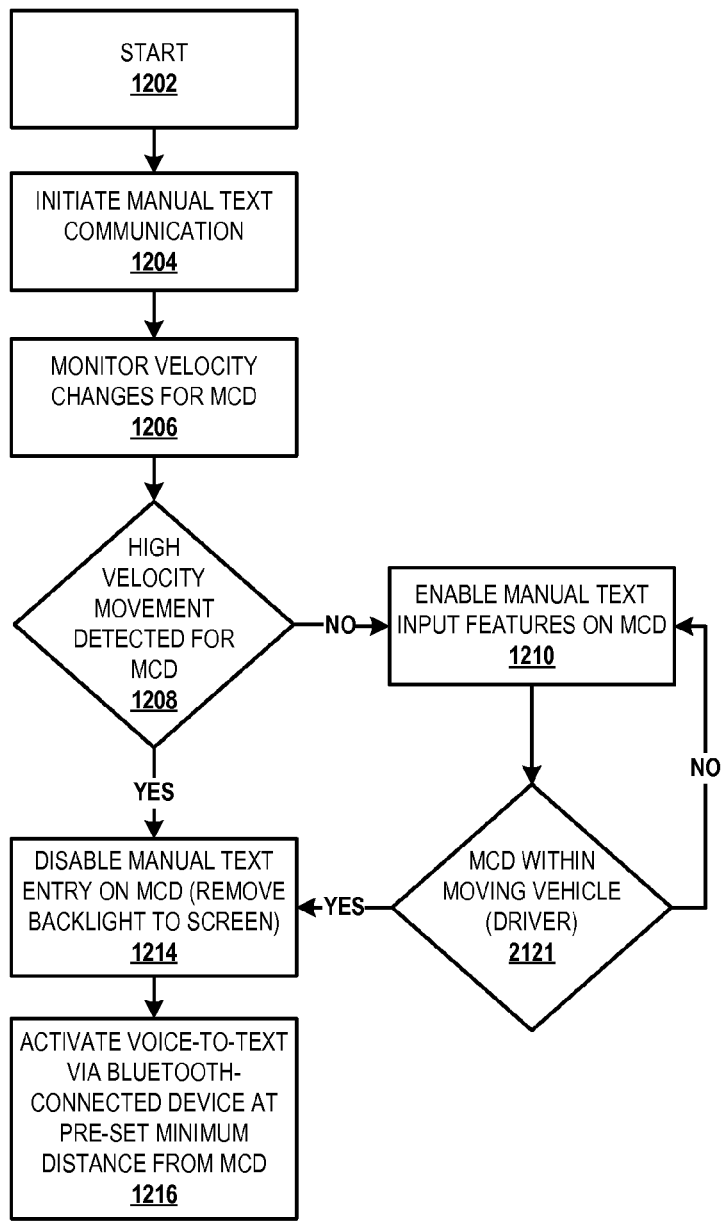
FIG. 12 is a high-level flow diagram of the method by which a mobile communication device provides dynamic toggling of manual texting functionality of the mobile communication device to a voice-to-text only texting functionality, in accordance with one or more embodiments.
Figure 13:
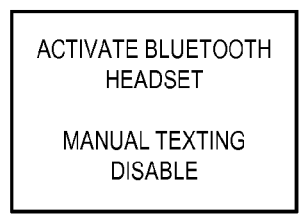
FIG. 13 is a block diagram representation of a user interface of MCD notifying the user of the unavailability of manual texting features of MCD, according to one embodiment.

FIG. 12 is a high-level flow diagram of the method by which a mobile communication device provides dynamic toggling of manual texting functionality of the mobile communication device to a voice-to-text only texting functionality. According to the described embodiment, this functionality also disables the display screen view and manual entry options. The method process begins t block 1202 and proceeds to block 1204 at which MCD allows user to perform manual texting communications from MCD 100/200. MCD utility 110 monitors for a velocity change in the MCD 100 (block 1206), which is determined via triangulation of wireless signals and/or use of the GPS/LPS device 124 within MCD 100/200. MCD utility 110 determines at block 1208 whether the velocity surpasses a pre-established threshold velocity of movement. If the velocity is not at the threshold point, MCD utility allows manual texting communication features (block 1210). At decision block 1212, MCD utility also determines whether the MCD 100/200 detects signals that indicate that the MCD 100/200 is located behind the drivers seat of a vehicle (indicating that the MCD user may be driving). If the MCD utility receives data that indicates the MCD is being utilized while the user is in the driver's seat of a vehicle (and the vehicle is moving—as determined by the high velocity movement of the MCD), then MCD utility 110 sends a signal to the power management control of the MCD 100/200 to disable the keypad and display from receiving input for manual text based communication (block 1214). As illustrated by display interface 1300 of FIG. 13, disabling of the text messaging functionality may be noticed 1305 on the display of MCD 100/200 or voiced electronically 1310 to the user. MCD utility 110 may then activate a voice-to-text messaging feature via a Bluetooth or wired headset that is located a minimum distance from the MCD 100/200 (block 1216). The minimum distance is a safe distance at which the user is not able to manually handle the MCD while engaging in the voice to text communication.

Thus, the embodiments provide, in a communication device, a method comprising: detecting that the communication device is in a driver's location of a moving vehicle; and automatically disabling manual texting functions of the communication device. In one embodiment, the method of further comprises: enabling voice-to-text communication of the communication device from a remote voice microphone that is physically located a pre-set distance away from the mobile device at which distance the user of the mobile device is not able to manually interact with the communication device. In yet another embodiment, the method comprises providing an audible electronic notification of the automatically disabling of the manual texting functions.

In addition to the describe methods, illustrated in part by the flow charts, one embodiment provides the above presented method functions within a MCD 200, while another embodiment provides the method functions as a program product that is stored on a machine readable medium and executed on the MCD 100/200 to perform the method functions.

Notably, the features of the above described embodiments are fully applicable to computing on mobile devices, including but not limited to, smart phones, laptops, netbooks, personal digital assistants (PDAs), IPODs™, as well as computing on standard computer devices, including desktops and servers and laptops. With mobile device implementation, the various features of both embodiments enables easy and quick editing on the go, while directly accounting for the limited viewable screen space with which the user is able to track where content is being moved from or relocated to. The features are thus programmed within mobile operating systems and applications or provided as a downloaded utility for use on existing mobile devices. Generally, the ability to select content from different documents and re-located them to a new documents or to one of the open documents also provides for great flexibility in creation of new or modified documents from previous documents having content of value within the new document, without having the scroll through the new document to locate the space to paste a previously cut/copied content. Working from the new document provides the added benefit of knowing exactly what content is needed at the specific location in which the content is later inserted.

The enhanced editing functions are associated with and enhance the functionality of software applications created for execution on the mobile device, such as Windows Mobile® and other applications which provides any of the standard editing functions (e.g., copy and paste within the address book of the mobile communication device).

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. In a first communication device having functional components for completing both a voice communication and a text communication, a method comprising:
   while a first voice communication is ongoing with a second communication device, the first communication device receiving an incoming request for a second voice communication with a third device;
   determining a relative priority of the first voice communication and the second voice communication;
   activating a text messaging function of the first communication device in response to receiving the incoming request;
   in response to the second voice communication having a higher priority than the first voice communication: automatically toggling the first voice communication to a text-based communication; and activating the second voice communication with the third communication device; and
   when the first voice communication has a higher priority than the second voice communication, enabling text-based communication with the third communication device while the first voice communication is ongoing.

2. The method of claim 1, wherein said determining a relative priority further comprises determining if the second voice communication request is received from a third party number that is pre-established as a higher priority number that a second party number with which the first voice communication is being conducted.

3. In a first communication device having functional components for completing both a voice communication and a text communication, a method comprising:
   while a first voice communication is ongoing with a second communication device, the first communication device receiving an incoming request for a second voice communication with a third device;
   activating a text messaging function of the first communication device in response to receiving the incoming request;
   enabling text-based communication with the third communication device while the first voice communication is ongoing;

when the first communication device is a multiple subscriber number device (MSND), and the second voice communication request is received on a second subscriber number while the first voice communication is ongoing on a first subscriber number:
  determining if the second subscriber number has a higher pre-established priority than the first subscriber number; and
  automatically toggling the first voice communication to a text-based communication and initiating the second voice communication on the second subscriber number in response to the second subscriber number having a higher pre-established priority than the first subscriber number.

4. A first communication device having functional components that complete both a voice communication and a text communication by configuring the device to:
  while a first voice communication is ongoing with a second communication device, receive an incoming request for a second voice communication with a third device;
  determine a relative priority of the first voice communication and the second voice communication;
  activate a text messaging function of the first communication device in response to receiving the incoming request;
  in response to the second voice communication having a higher priority than the first voice communication: automatically toggle the first voice communication to a text-based communication; and activating the second voice communication with the third communication device; and
  when the first voice communication has a higher priority than the second voice communication, enable text-based communication with the third communication device while the first voice communication is ongoing.

5. The first communication device of claim 4, wherein said functional components that configures the device to determine a relative priority further comprises functional components that configures the device to determine if the second voice communication request is received from a third party number that is pre-established as a higher priority number that a second party number with which the first voice communication is being conducted.

6. A first communication device having functional components that complete both a voice communication and a text communication by configuring the device to:
  while a first voice communication is ongoing with a second communication device, receive an incoming request for a second voice communication with a third device;
  activate a text messaging function of the first communication device in response to receiving the incoming request;
  enable text-based communication with the third communication device while the first voice communication is ongoing; and
  when the first communication device is a multiple subscriber number device (MSND), and the second voice communication request is received on a second subscriber number while the first voice communication is ongoing on a first subscriber number:
    determine if the second subscriber number has a higher pre-established priority than the first subscriber number; and
    automatically toggle the first voice communication to a text-based communication and initiate the second voice communication on the second subscriber number in response to the second subscriber number having a higher pre-established priority than the first subscriber number.

7. A computer program product for application within a first communication device having functional components for completing both a voice communication and a text communication, the computer program product comprising a non-transitory computer readable storage device; and program code on the non-transitory computer readable storage device that configures the first communication device to complete the functions of:
  while a first voice communication is ongoing with a second communication device, receiving an incoming request for a second voice communication with a third device;
  determining a relative priority of the first voice communication and the second voice communication;
  activating a text messaging function of the first communication device in response to receiving the incoming request;
  in response to the second voice communication having a higher priority than the first voice communication: automatically toggling the first voice communication to a text-based communication; and activating the second voice communication with the third communication device; and
  when the first voice communication has a higher priority than the second voice communication, enabling text-based communication with the third communication device while the first voice communication is ongoing.

8. The computer program product of claim 7, wherein said program code for determining a relative priority further comprises program code for determining if the second voice communication request is received from a third party number that is pre-established as a higher priority number that a second party number with which the first voice communication is being conducted.

9. A computer program product for application within a first communication device having functional components for completing both a voice communication and a text communication, the computer program product comprising non-transitory a computer readable storage device;
  and program code on the non-transitory computer readable storage device that configures the first communication device to complete the functions of:
    while a first voice communication is ongoing with a second communication device, receiving an incoming request for a second voice communication with a third device;
    activating a text messaging function of the first communication device in response to receiving the incoming request;
    enabling text-based communication with the third communication device while the first voice communication is ongoing; and
    when the first communication device is a multiple subscriber number device (MSND), and the second voice communication request is received on a second subscriber number while the first voice communication is ongoing on a first subscriber number:
      determining if the second subscriber number has a higher pre-established priority than the first subscriber number; and
      automatically toggling the first voice communication to a text-based communication and initiating the second voice communication on the second subscriber number in response to the second subscriber number having a higher pre-established priority than the first subscriber number.

* * * * *